(12) United States Patent　　(10) Patent No.: US 12,686,391 B2

Bakhchina et al.　　(45) Date of Patent: Jul. 21, 2026

(54) DRIVER PSYCHOPHYSIOLOGICAL STATE DETECTION

(71) Applicant: Harman International Industries, Incorporated, Stamford, CT (US)

(72) Inventors: Anastasiya Vladimirovna Bakhchina, Nizhniy Novgorod (RU); Ivan Sergeevich Shishalov, Nizhniy Novgorod (RU); Mariya Yurievna Nevaykina, Nizhny Novgorod (RU); Anton Konstantinovich Yakimov, Nizhny Novgorod (RU); Anton Sergeevich Devyatkin, Nizhny Novgorod (RU); Mikhail Sergeevich Sotnikov, Nizhny Novgorod (RU); Andrey Viktorovich Filimonov, Nizhegorodskaya oblast (RU); Vladimir Vladimirovich Borzikov, Yerevan (AM)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 80 days.

(21) Appl. No.: 18/622,695

(22) Filed: Mar. 29, 2024

(65) Prior Publication Data

US 2024/0326831 A1　　Oct. 3, 2024

(30) Foreign Application Priority Data

Mar. 30, 2023　(RU) ........................... RU2023107736

(51) Int. Cl.
*B60W 40/09* (2012.01)
*G06V 20/59* (2022.01)
(Continued)

(52) U.S. Cl.
CPC ........... *B60W 40/09* (2013.01); *G06V 20/597* (2022.01); *G06V 40/161* (2022.01); *G06V 40/18* (2022.01);
(Continued)

(58) Field of Classification Search
CPC ......... B60W 40/09; B60W 2040/0827; B60W 2040/0872; B60W 2420/403;
(Continued)

(56) References Cited

U.S. PATENT DOCUMENTS

2004/0044293 A1* 3/2004 Burton ...................... B60T 7/12
600/544
2012/0133515 A1* 5/2012 Palshof ................. B60W 50/14
340/575
(Continued)

OTHER PUBLICATIONS

Ahlstrom, C. et al., "Measuring driver impairments: sleepiness, distraction, and workload," IEEE Pulse, vol. 3, No. 2, Mar. 2012, 9 pages.
(Continued)

*Primary Examiner* — Ryan W Sherwin

(74) *Attorney, Agent, or Firm* — McCoy Russell LLP

(57) ABSTRACT

It is herein disclosed a method of collecting data for determining a psychophysiological state of a human driver, comprising collecting data throughout a driving session, wherein the driving session comprises a predetermined time period of non-stop driving by a driver in a monotonous driving environment and a plurality of detection response tasks (DRTs) performed by the driver in the predetermined time period, wherein each DRT comprises the driver reacting to at least one visual stimulus; wherein said collecting data comprises: collecting, by a plurality of detection means, physiological data on the driver throughout the predetermined time period; wherein the physiological data collected comprises at least one of: heart rate data, electroencephalo-
(Continued)

gram data, eye movement data, and respiration data; and collecting driver behaviour data, comprising recording steer wheel activity of the driver and recording a manner in which the driver reacts to the visual stimulus during the plurality of DRTs.

12 Claims, 6 Drawing Sheets

(51) Int. Cl.
| | |
|---|---|
| *G06V 40/16* | (2022.01) |
| *G06V 40/18* | (2022.01) |
| *B60W 40/08* | (2012.01) |

(52) U.S. Cl.
CPC ............... *B60W 2040/0827* (2013.01); *B60W 2040/0872* (2013.01); *B60W 2420/403* (2013.01); *B60W 2540/22* (2013.01); *B60W 2540/221* (2020.02); *B60W 2540/229* (2020.02)

(58) Field of Classification Search
CPC ....... B60W 2540/22; B60W 2540/221; B60W 2540/229; G06V 20/597; G06V 40/161; G06V 40/18; A61B 5/163; A61B 5/165; A61B 5/18; A61B 5/0077; A61B 5/0205; A61B 5/11; A61B 5/318; A61B 5/352; A61B 5/369; A61B 5/4088; A61B 5/6893; G08B 21/06
See application file for complete search history.

(56) References Cited

U.S. PATENT DOCUMENTS

| | | | | | |
|---|---|---|---|---|---|
| 2015/0105641 | A1* | 4/2015 | Austin | ................. | B60N 2/0023 |
| | | | | | 600/300 |
| 2016/0046295 | A1* | 2/2016 | Wacker | .................. | A61B 3/113 |
| | | | | | 701/45 |
| 2016/0148523 | A1* | 5/2016 | Winston | ................. | A61B 5/162 |
| | | | | | 434/236 |
| 2019/0077409 | A1* | 3/2019 | Zandi | ....................... | G06F 3/013 |
| 2020/0151474 | A1* | 5/2020 | Zandi | ....................... | G06F 3/013 |
| 2021/0370891 | A1* | 12/2021 | Hanada | ................. | B60W 40/08 |
| 2022/0095975 | A1* | 3/2022 | Aluf | ........................ | A61B 3/113 |
| 2023/0218159 | A1* | 7/2023 | Eadie | ................... | A61B 3/0091 |
| | | | | | 600/558 |

OTHER PUBLICATIONS

Cegovnik, T. et al., "An analysis of the suitability of a low-cost eye tracker for assessing the cognitive load of drivers," Applied Ergonomics, vol. 68, Apr. 2018, Available Online Oct. 31, 2017, 11 pages.

Govindarajan, V. et al., "Affective Driver State Monitoring for Personalized, Adaptive ADAS," Proceedings of the 2018 21st International Conference on Intelligent Transportation Systems (ITSC), Nov. 4, 2018, Maui, Hawaii, 6 pages.

Das, K. et al., "Detection and Recognition of Driver Distraction Using Multimodal Signals," ACM Transactions on Interactive Intelligent Systems, vol. 12, No. 4, Dec. 12, 2022, 26 pages.

European Patent Office, Extended European Search Report Issued in Application No. 23204520.3, Jan. 19, 2024, Germany, 10 pages.

Morales, J. et al., "Monitoring driver fatigue using a single-channel electroencephalographic device: A validation study by gaze-based, driving performance, and subjective data," Accident: Analysis and Prevention, vol. 109, Dec. 2017, 8 pages.

Stojmenova, K. et al., "Detection-Response Task-Uses and Limitations," Sensors, vol. 18, No. 2, Feb. 14, 2018, 17 pages.

European Patent Office, Office Action Issued in Application No. 23204520.3, Mar. 13, 2026, Germany, 9 pages.

* cited by examiner

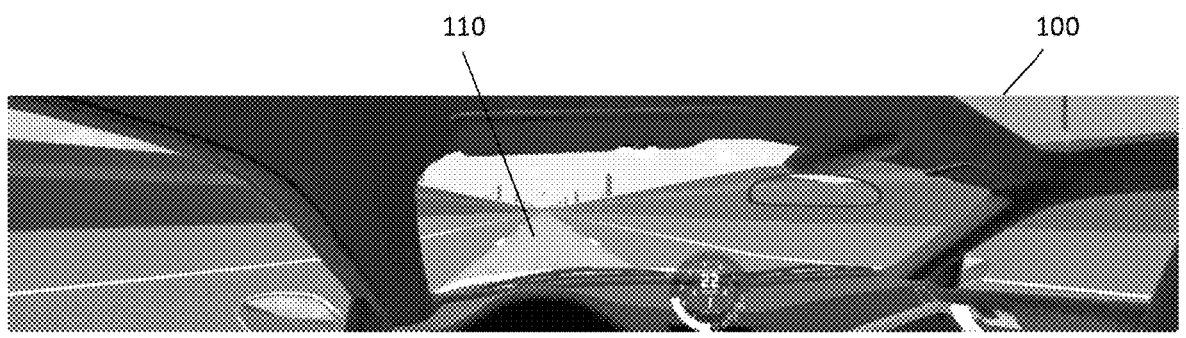
FIG. 1
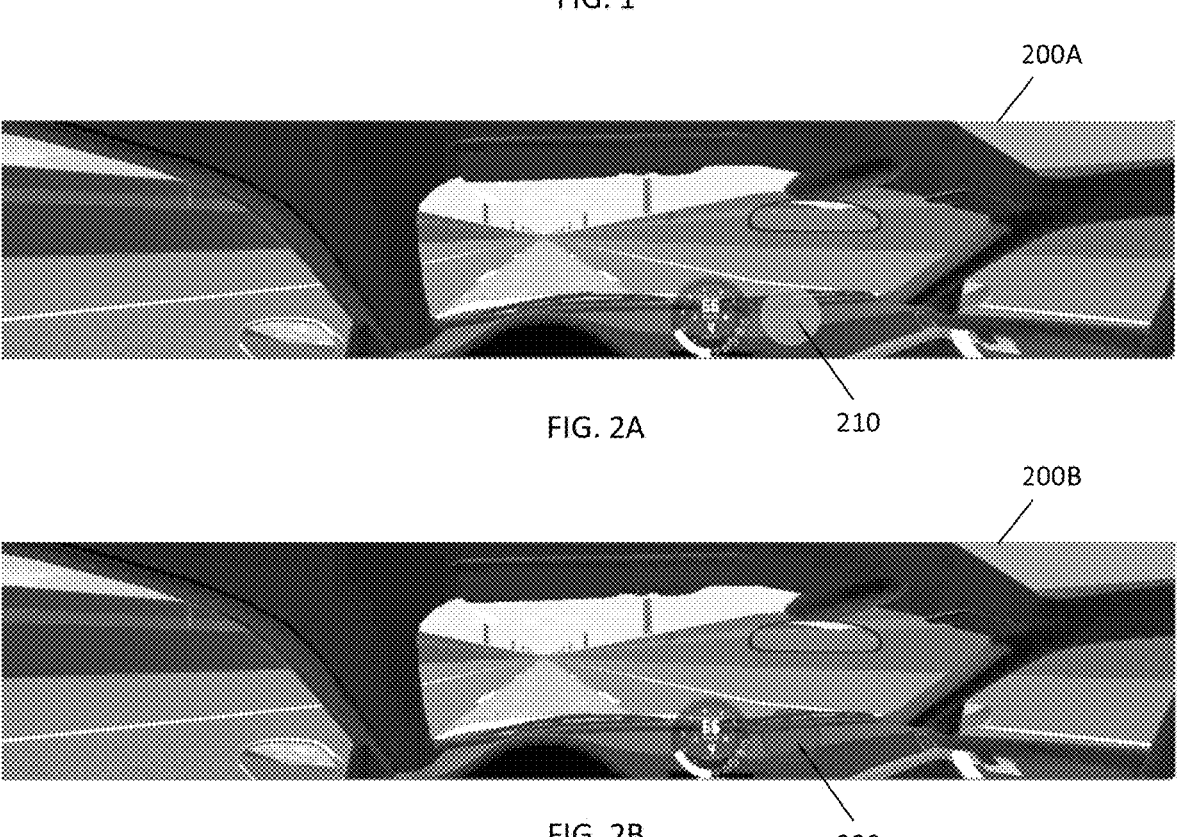
FIG. 2A
FIG. 2B

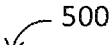
500 collecting data throughout a driving session, wherein the driving session comprises a predetermined time period of non-stop driving by a driver in a monotonous driving environment and a plurality of detection response tasks (DRTs) performed by the driver in the predetermined time period, wherein each DRT comprises the driver reacting to at least one visual stimulus 510 collecting, by a plurality of detection means, physiological data on the driver throughout the predetermined time period; wherein the physiological data collected comprises at least one of: heart rate data, EEG data, eye movement data, and respiration data 512 collecting driver behaviour data, comprising recording steer wheel activity of the driver, and recording the driver's reaction to the at least one visual stimulus during the plurality of DRTs 514 analysing the physiological data and the driver behaviour data to determine a level of drowsiness of the driver during the driving session 520

FIG. 5

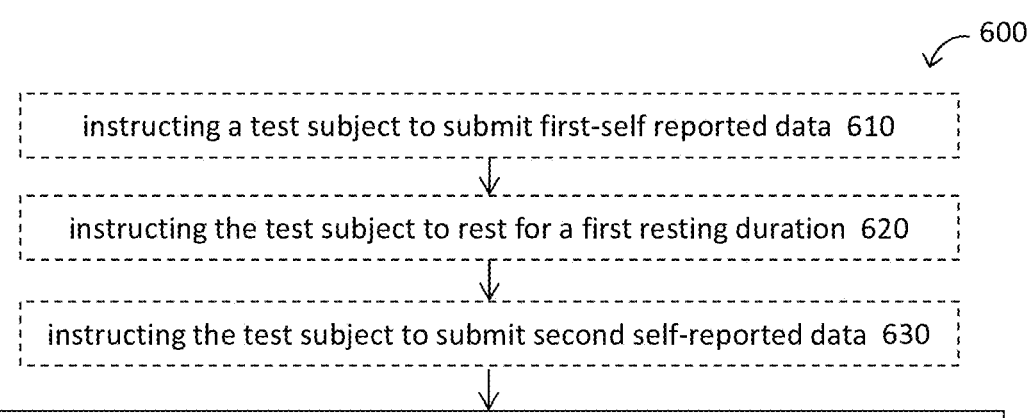

600 instructing a test subject to submit first-self reported data  610 instructing the test subject to rest for a first resting duration  620 instructing the test subject to submit second self-reported data  630 instructing the test subject to perform a driving session, wherein the driving session comprises a predetermined time period of non-stop driving in a monotonous driving environment and a plurality of detection response tasks (DRTs) performed by the test subject in the predetermined time period, wherein each DRT comprises the test subject reacting to at least one visual stimulus  640 collecting data throughout the driving session  650 collecting, using a plurality of detection means, physiological data on the test subject throughout the predetermined time period; wherein the physiological data collected comprises at least one of: heart rate data, EEG data, eye movement data, and respiration data  652 collecting driver behaviour data, comprising recording steer wheel activity of the test subject , and recording a manner in which the test subject reacts to the at least one visual stimulus during the plurality of DRTs  654

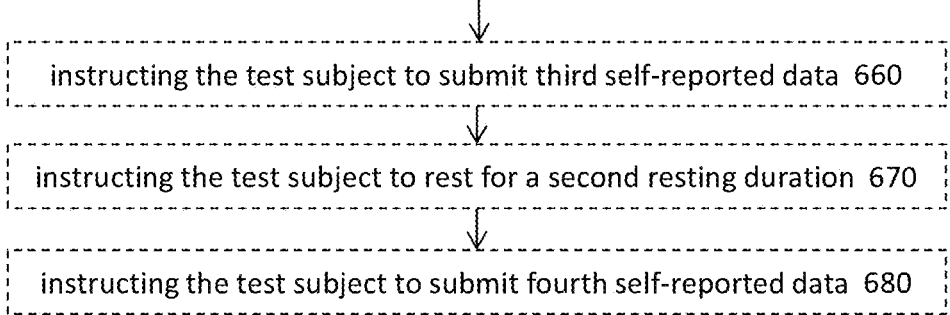

instructing the test subject to submit third self-reported data  660 instructing the test subject to rest for a second resting duration  670 instructing the test subject to submit fourth self-reported data  680

FIG. 6

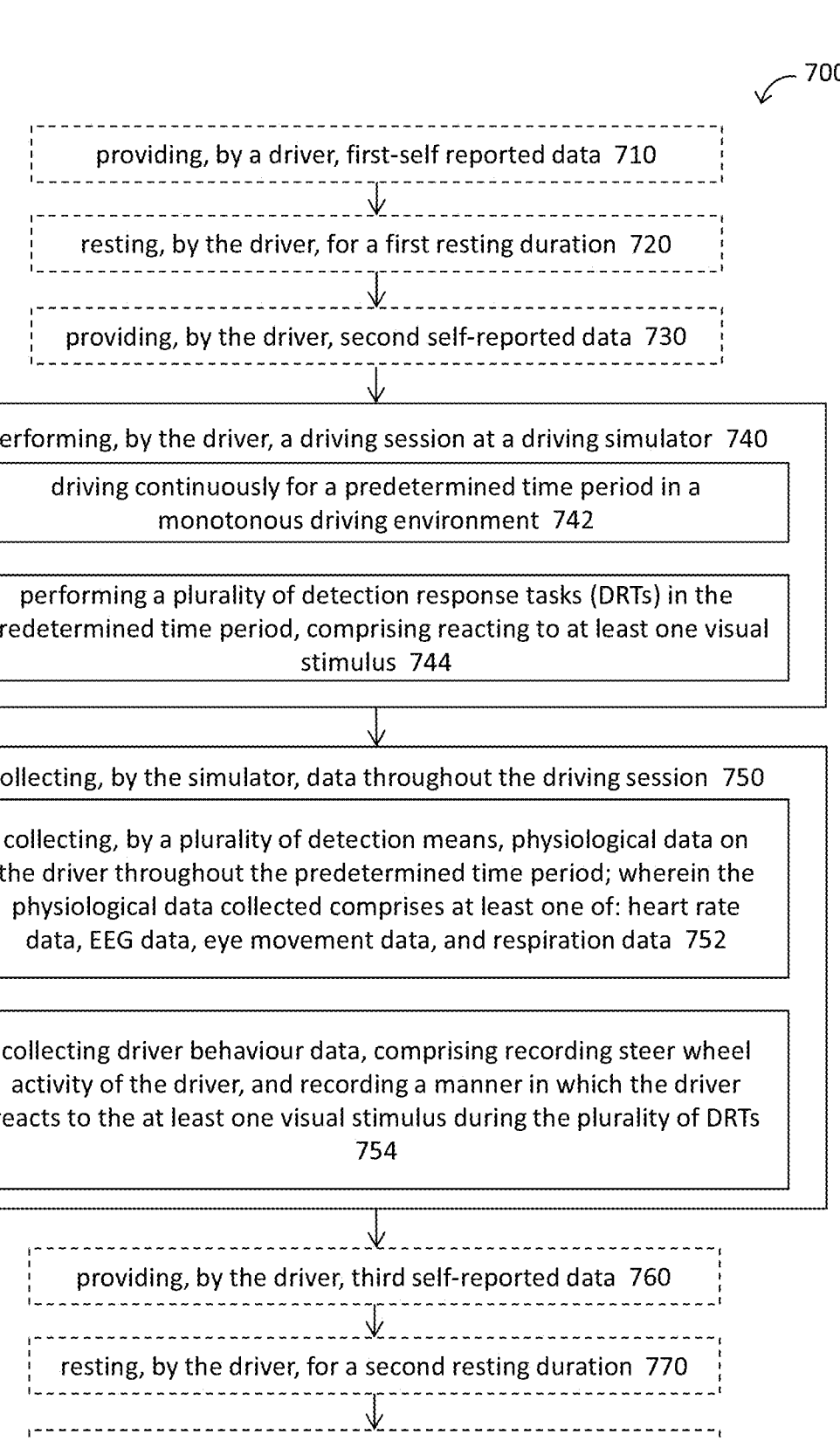

700 providing, by a driver, first-self reported data  710 resting, by the driver, for a first resting duration  720 providing, by the driver, second self-reported data  730 performing, by the driver, a driving session at a driving simulator  740 driving continuously for a predetermined time period in a monotonous driving environment  742 performing a plurality of detection response tasks (DRTs) in the predetermined time period, comprising reacting to at least one visual stimulus  744 collecting, by the simulator, data throughout the driving session  750 collecting, by a plurality of detection means, physiological data on the driver throughout the predetermined time period; wherein the physiological data collected comprises at least one of: heart rate data, EEG data, eye movement data, and respiration data  752 collecting driver behaviour data, comprising recording steer wheel activity of the driver, and recording a manner in which the driver reacts to the at least one visual stimulus during the plurality of DRTs  754 providing, by the driver, third self-reported data  760 resting, by the driver, for a second resting duration  770 providing, by the driver, fourth self-reported data  780

FIG. 7

DRIVER PSYCHOPHYSIOLOGICAL STATE DETECTION

CROSS REFERENCE TO RELATED APPLICATIONS

The present application claims priority to Russian Application No. 2023107736, entitled "DRIVER PSYCHO-PHYSIOLOGICAL STATE DETECTION", and filed on Mar. 30, 2023. The entire contents of the above-listed application are hereby incorporated by reference for all purposes.

TECHNICAL FIELD

Aspects of the present disclosure relate to advanced driver assistance systems (ADAS) and monitoring of human cognitive workload in the automotive industry.

BACKGROUND

Data plays an essential role in many machine learning-related projects, and is particularly needed in developing ADAS in the automotive industry. Research is carried out to investigate human engagement to driving conditions, through careful planning and/or control of lab-based or real-life driving experiments, detecting what mental effort is required of and applied by a human being for road-related cognition and other aspects of cognition, when driving. It is important to compile a large volume of data on human drivers' psychophysiological states and cognitive workloads while driving under monitored or controlled road conditions, environment conditions, levels of distraction, etc., that could be analysed in order to develop a driving monitoring systems in smart vehicles, for example.

The way in which such data is gathered needs to be thoroughly planned and carefully controlled. In previously known driving data collection experiments, biases can easily be inadvertently introduced, affecting the reliability of the data; processing and analysis of the data may become difficult or impossible, and no meaningful results may be derived.

There is therefore recognised a need to provide a new and optimised structure, protocol, and/or scenario for in-lab or in-car data collection sessions, for the sake of building a system for human psychophysiological state detection during driving and associated research.

SUMMARY

Through a process of optimisation that takes into account limitations imposed by engineering, human psychology and physiology, and resource management, a preferred way of carrying out consistent experiments to collect the psychophysiological state of a driver during driving has been developed by inventors, and described as follows.

In accordance with one of the aspects of the present disclosure, there is provided a method of collecting data for determining a psychophysiological state of a human driver, comprising: collecting data throughout a driving session, wherein the driving session comprises a predetermined time period of non-stop driving by a driver in a monotonous driving environment and a plurality of detection response tasks (DRTs) performed by the driver in the predetermined time period, wherein each DRT comprises the driver reacting to at least one visual stimulus; wherein said collecting data comprises: collecting, by a plurality of detection means, physiological data on the driver throughout the predetermined time period, wherein the physiological data collected comprises at least one of: heart rate data, electroencephalogram (EEG) data, eye movement data, and respiration data; and collecting driver behaviour data, comprising: recording steer wheel activity of the driver; and recording the driver's reaction (i.e. the manner in which the driver reacts) to the at least one visual stimulus during the plurality of DRTs.

Preferably, said non-stop driving by the driver takes place in a simulated road environment using a car simulator.

Preferably, the each DRT comprises the driver reacting to the at least one visual stimulus as soon as possible, and wherein said recording the driver's reaction comprises at least one of: recording a response time of the user in reaction to the visual stimulus, a number of correct responses, and a number of incorrect responses. Preferably, in each DRT the driver reacts to the at least one visual stimulus by physically pressing a button. Preferably, in at least one of the plurality of DRTs, at least one false stimulus is provided to the driver that the driver is instructed to ignore; wherein, preferably, the visual stimulus comprises a visual indication in a first colour, and the false stimulus comprises a visual indication in a second colour different from the first colour.

Preferably, the predetermined time period of the non-stop driving is under 130 minutes, and preferably between 120 and 125 minutes. Preferably, each of the plurality of DRTs during the predetermined time period has a duration of between 2 and 4 minutes, and more preferably between 2.5 and 3.5 minutes. Preferably, a time interval between successive DRTs is between 25 and 30 minutes, and preferably 26 to 28 minutes.

Preferably, the driving session takes place after a first period of rest by the driver for a first predetermined duration, and a second period of rest by the driver for a second predetermined duration takes place after the driving session.

Preferably, the method further comprises collecting self-reported data from the driver before and after the driving session, the self-reported data comprising data on at least one of: the driver's psychological state, physical state and prior sleep conditions; preferably, the self-reported data is provided by the driver in the form of at least one questionnaire. Preferably, collecting self-reported data comprises: collecting first self-reported data before the first period of rest; collecting second self-reported data after the first period of rest and before the driving session; collecting third self-reported data after the driving session and before the second period of rest; and collecting fourth self-reported data after the second period of rest.

Preferably, the plurality of detection means comprises at least one of: ECG apparatus for obtaining heart rate data, EEG apparatus for obtaining EEG data, at least one eye-tracking camera for obtaining eye movement data, at least one camera for obtaining video data of the driver's face, and at least one photoplethysmography sensor to collect blood circulation data.

The method further comprises, optionally: analysing the physiological data and the driver behaviour data (and optionally the self-reported data) to determine a level of drowsiness of the driver during the driving session; and/or analysing the physiological data and driver behaviour data through storing the collected data in a memory and/or sending the collected data to a processor for analysis; and/or storing results of the analysis and the collected physiological data and the collected driving behaviour data in a database and using the database as training data for a machine-learning algorithm to predict or estimate the psychological state of a driver when driving.

In accordance with another one of the aspects of the present disclosure, there is provided a system for collecting data for determining a psychophysiological state of a human driver, comprising: means for collecting data throughout a driving session, wherein the driving session comprises a predetermined time period of non-stop driving by a driver in a monotonous driving environment and a plurality of detection response tasks (DRTs) performed by the driver in the predetermined time period, wherein each DRT comprises the driver reacting to at least one visual stimulus; wherein the means for collecting data comprises: a plurality of detection means for collecting physiological data on the driver throughout the predetermined time period, wherein the physiological data collected comprises at least one of: heart rate data, electroencephalogram (EEG) data, eye movement data, and respiration data; and means for collecting driver behaviour data, comprising: means for recording steer wheel activity of the driver, and means for recording the driver's reaction to the at least one visual stimulus during the plurality of DRTs.

BRIEF DESCRIPTION OF THE DRAWINGS

FIG. 1 is an illustration showing a view seen by a driver in a car simulator in accordance with an example.

FIGS. 2A and 2B are illustrations showing other views seen by a driver in a car simulator in accordance with an example.

FIG. 5 is a flow chart for a method in accordance with an example.

FIG. 6 is a flow chart for a method in accordance with another example.

FIG. 7 is a flow chart for a method in accordance with another example.

DETAILED DESCRIPTION OF THE INVENTION

Figures 3A, 3B:
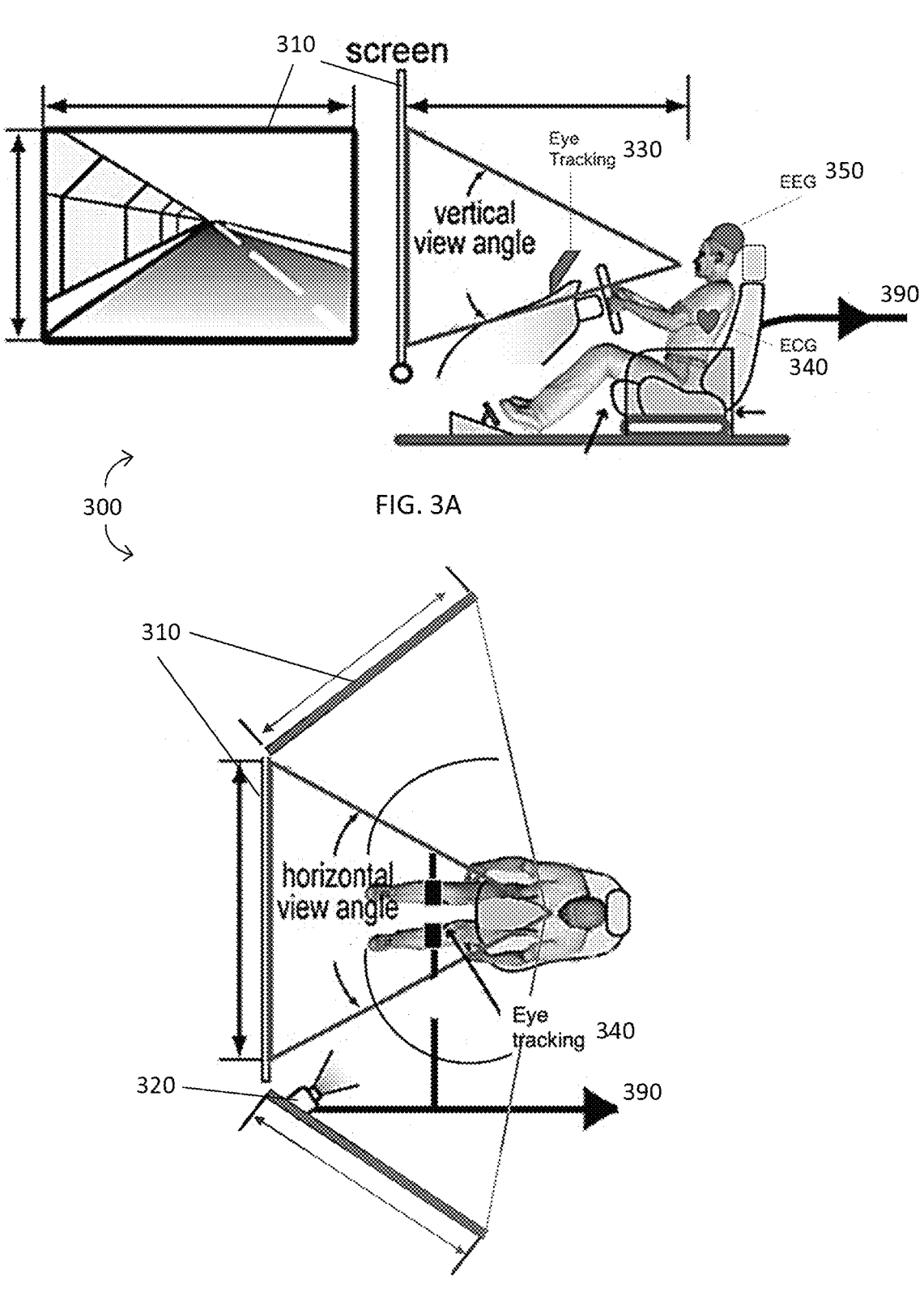
FIGS. 3A and 3B are schematic diagrams (side view and bird's eye view, respectively) showing experimental apparatus in accordance with an example.

It is herein disclosed a method or protocol for sessions conducted to consistently generate and collect data in relation to a human test subject when driving. In particular, the sessions are for "monotonous" or "monotonic" driving, to obtain data connected to levels of drowsiness (or alertness) of the subject.

A test session may be structured in three parts: an introductory phase comprising preparatory actions, such as letting the subject wear monitoring equipment (e.g. an ECG monitor); the main bulk of the experiment comprising a sequence of data collection phases; and a concluding phases comprising post-experiment actions, such as helping the subject take off monitoring equipment.

The environment of a test session may differ. It may either be an in-lab session, or an in-car session. Each may need to be configured prior to the experiment. A laboratory-based session may require configuration of a car simulator. An in-car session may require configuration of the vehicle that the participant is going to drive, and the route that he (or she) needs to follow.

In the main data-collection phase of the experiment itself, various data relating to the human subject's psychophysiological state is collected, by sensing/monitoring/data-collection means. These typically involve sensors/detectors/ monitors that attached to the subject's body to collect bio-signals, and those that are located in the subject's environment.

In carrying out sessions consistently and carefully according to a pre-defined protocol, reliable data can be assembled for exploring human psychological and physiological states when engaged in driving a vehicle in connection with environmental and road conditions, useful in the automotive industry and beyond. Such data can illuminate the levels and types of cognitive load induced by driving and internal cognition, stress induced by the same, and levels of drowsiness (or of alertness).

A testing protocol in a simulated driving environment is now described with respect to an exemplary embodiment. It has been identified by the inventors to be an optimum protocol, in terms of balancing various factors and constraints, including demands on the test subject (he will be overly tired in an overly long experiment), need for sufficient and reliable data (the experiment cannot be too short because sufficient volumes of data needs to be collected, and also because human mental states normally takes time to change), limitations on the equipment (e.g. configuration or processing time required outside and inside of the experiment duration), cost of running an experiment (an unnecessarily long experiment wastes resources).

Possible variations in the protocol are thereafter discussed. Different aspects, elements and preferences for each type or category of experimental protocols disclosed herein may be combined or interchanged; all logical combinations and changes of elements and aspects between examples are considered to be within the scope of disclosure.

Driving and Cognitive Tests

In an exemplary example, described with reference to FIGS. 1, 2A, 2B, 3A and 3B, a simulated driving environment is provided to a participating driver. This may comprise a driving simulator 300, comprising one or more screen(s) 310 operable to show a simulated view 100 of one or more roads, and a plurality of features corresponding to an automotive vehicle including, most importantly, a driver's seat and steering wheel. Some features may either be provided virtually on the screen(s), such as a speedometer.

The protocol to be followed by the driver involves driving on an endless track, simulating an instance of highway driving. It is desired that the experiment investigates the driver's responses when under monotonous conditions, such as a driving environment that is intended to be monotonous and almost featureless, to the point that the driver experiences drowsiness of varying levels and even to the point of sleep.

The driver is instructed to sit down on the seat and to look at the screen(s) 310 as though in a real car looking out of the windscreen ahead. An example of the scenario seen by the driver is shown in FIG. 1. He (or she) is instructed to drive non-stop i.e. constantly, for the duration of the experiment. The duration is preferably a predetermined period of time, such as 123 minutes or approximately 2 hours.

The driver is instructed to drive only on an indicated lane. The indication may be in the form of highlighting, i.e. the correct lane is highlighted 110, e.g. in yellow; preferably, no other additional signals about lane changes are needed. The driver needs to change to a different lane in response to a lane change indication being shown on the screen when this occurs. For example, the lane change indication is in the form of the new lane being highlighted instead of the current lane. At the same time, the driver is instructed to keep obeying the rules of the road and speed limits (e.g. 45 mph or 72 km/h) where applicable. The driver is reminded that driving safety remains the main priority. After a certain period of time, the lane indication may change, so that a different lane is highlighted, and the driver according to the instructions given, needs to change lanes again to the now highlighted lane.

Preferably, there are multiple lane changes, e.g. 10 times, during an experiment. Indications for a lane change may occur at regular intervals, or at random intervals e.g. in the range of every 3 to 10 minutes (in steps of 1 minute).

Preferably, the highlighting of lanes switches from one to the other with no time gap, i.e. 0 seconds elapse between the de-highlighting of one lane and the highlighting of another lane.

The driver is not prevented from leaving the correct lane and/or using another of the lanes visible, i.e. an incorrect, non-highlighted lane; however, this will be noted as a mistake in later processing and analysis of the collected data.

For the duration of the experiment, the driver is also prompted to take part in a plurality of cognitive tests, preferably a series of reaction time tests or detection response tasks (DRTs). These may serve as mental exercises that require instances of active decision-making (as opposed to an intuitive/unconscious reaction), revealing information on the driver's cognitive load, through reaction times, and the frequency of correct and incorrect responses, for example.

Preferably, these reaction tasks do not take place during the same periods when lane-switching is happening, although it would be an option.

In a DRT, the task for the participant is to react in a certain way as soon as possible to a stimulus. In an exemplary DRT, this stimulus may take the form of an indication 210 that appears on the screen(s) of the simulator. For example, the indication is a sign, e.g. a green circle, appearing at the bottom right corner of the screen, next to the speedometer. For example, the participant is tasked to react by pressing a pedal, e.g. the right pedal under the steering wheel, or alternatively pressing a button provided somewhere in the simulator (e.g. on or near the steering wheel, on the dashboard/panel). The participant is instructed to not interrupt driving when performing such responses.

Other indications or signs may appear during the DRT to serve as distraction. For example, if a red circle 220 lights up instead of (or in addition to) the green circle, the driver should not react and simply ignore the red circle, as the green circle is the only correct actionable stimulus.

In one example, there are five DRTs to be performed at multiple points of time in one test session according to the experimental protocol. The intervals between the plurality of DRTs may be regular or irregular. Each DRT may take a predetermined duration of time to complete, for example 3 minutes each. For example, a 3-minute DRT is performed at the start of a 123-minute driving test, and all DRTs are separated by 27-minute gaps.

Exemplary DRT settings include:

Ratio of green (action) and red (stop) lights is 50/50.

Intervals between successive stimuli are random, within a predetermined range (e.g. 1000 to 3000 ms, in steps of 150 ms).

Order of appearance of green and red lights is random.

DRT measurements are sensitive to the test subject's overall mental workload, and DRT metrics are used to differentiate attentional loads. Normally, three DRT variants can be used: Head-mounted DRT (HDRT), Remote DRT (RDRT), and Tactile DRT (TDRT). In the present experiment protocol, the DRT stimulus is visually presented. DRT performance includes three metrics: response time, number of false alarms, and number of passes.

The Test Session

The testing protocol and thus its results are optimised to ensure the lack of cognitive distraction, undue influences and implications, and psychological biases. Distractions should be avoided or at least minimised; the subject may thus be instructed to avoid activities that influence alertness when driving, in the monotonous road conditions. For example, the subject may be instructed not to talk with another person (e.g. on a phone) or listen to music while driving. Furthermore, conversations shortly before the driving starts, especially anything that may create a bias in the subject's mind as to his upcoming experience or feelings (e.g. of tiredness), are preferably also be avoided. Rate of success in collection of reliable, clean data is therefore improved.

Experimental timings-total duration of the experiment, duration of the main driving process, duration of the DRT tasks, etc.—are of importance. For example, the preferable total driving period of about 120 minutes (preferably 123 minutes in accordance with the breakdown in Appendix 1) has been identified by the inventors as striking a balance between abundance and reliability of data collected, against equipment limitations and cost; there are multiple factors that affect the total duration that the driver is asked to drive for, for example. These factors may concern limitations imposed by engineering, human psychology and physiology, which need to be taken into account during an optimisation process. For example, if the duration of driving is unduly shortened, one may have to make assumptions that human mental/cognitive states switch instantaneously, which would negatively affect the quality of subsequent analysis.

In an embodiment of the test method herein disclosed, the driver experiences a simple highway driving scenario in the simulator. The environment is flat and desert-like, with no passing traffic, to provide a monotonous sensory experience. The human brain and body, when under continuous monotonous (repetitive, boring) conditions, tend to conserve energy and may start to fall asleep. It is an aim for the test to explore different states or levels of drowsiness/alertness, between extremes of actual sleep and of stressed alertness.

In this example, the time for the driving scenario is about 123 min (the simulated road is about 140 km long). Preferably, the total driving time is limited at no more than 130 minutes, more preferably no more than 125 minutes, more preferably between 120 and 125 minutes. The participant is asked to drive with the simulator non-stop, changing the line in accordance with the varying highlights on the lanes, and obeying the rules of the road and speed limits (72 km/h), as mentioned above. During driving, the driver is required to take a DRT 5 times, every 30 minutes. The task is to press the button (e.g. on the steering wheel, or a pedal) as soon as possible when a green sign lights up on the screen, and ignore any red signs.

There is preferably no special feedback on driving errors, but in cases of accidental vehicle damage or long-time speeding, the car may be forcibly stopped (rebooted). The participant may resume moving forward again.

An example of the experimental protocol, involving events and their timings, is provided in Appendix 1. This protocol including parameters such as length of each phase and test, and the order in which the phases/tests are carried out, has been identified by the inventors as an optimum or particularly preferable method of driving data collection.

However, departures from the values indicated in Appendix 1 are possible without affecting the reliability of the data acquired.

A reduced version of the protocol, shown in Appendix 2, may optionally be used in the case when it is proved that performing DRTs during driving slows down drowsiness levels.

In the present exemplary protocol, the participant may be introduced to the simulator environment for a short period, e.g. about 3 to 5 minutes. Apart from this introductory period and the actual driving period, there may also be a final rest period, in the following order:

rest period of about 5 minutes (baseline session);
simulated driving period of a maximum of about 123 minutes (driving session);
rest period of about 5 minutes (end session).

Apart from being asked to drive and having his data collected, the driver may be asked to fill in one or more questionnaires for each experiment. Preferably, these include:

A first questionnaire (type 1) before the driving experiment, to assess the driver's sleep quality in the previous night, consumption of caffeine, alcohol, medical prescription drugs and any other substances that may affect driving performance, for example;

Karolinska sleepiness scale (KSS) questionnaires (Åkerstedt and Gillberg, 1990) to be done before and at the end of the driving, after a respective period of rest; e.g. the driver is asked to rate his own drowsiness on a 9-level KSS for example.

A final questionnaire (type 3) after the end of the driving.

In other words, the subject is instructed to provide self-assessed data, subjectively rating his own psychological state based on his knowledge or perception related thereto, e.g. previous sleep quality, current level of tiredness or stress.

Further Experimental Preparations and Precautions

Before the experiment, in some examples, the following preparations may be asked of the participating driver:

change the duration of night sleep before the day of experiment from their usual duration, e.g. reduce it to 3 hours;

avoid consumption of foods and drinks that contain caffeine and any drowsiness-causing medications for at least 8 hours before the experiment;

avoid smoking or physical exertion for at least 2 hours before the experiment.

Explicit consent may be obtained from the driver for taking part in the experiment voluntarily and having his data collected. Other checks as to general health, neurological well-being, vision (e.g. colour blindness), any medication being taken (e.g. psychoactive medication), language skills and driving licence status (e.g. at least one year from driving licence acquisition) may also be done.

To prevent any unwanted effect that the circadian rhythms of the driver may have on the experiment and interfere with his drowsiness level, the experiment is preferably performed during predetermined times in the morning and/or afternoon. For example, it has been suggested 3 pm is the afternoon sleepiness peak in the human circadian rhythm, so the experiment may be timed accordingly to make use of or avoid that time.

The environment in which the driving simulator and the participant are situated and monitored is preferably a quiet and dark room maintained at a preferred temperature e.g.

approximately 23° C. Environmental conditions such as humidity and temperature may be monitored and form part of the group of data collected from the session.

Apparatus and Environment Configuration

The apparatus used in the experiment according to the present embodiment is now described.

The in-lab experiment is preferably performed through a fixed-base driving simulator 300 (such as one developed with BeamNGpy library (BeamNG.tech)).

It preferably includes a part of a car with conventional in-vehicle equipment such as a driver's seat, steer wheel, pedals and gear lever. Some may be omitted if considered unnecessary for an experiment. The simulator setup also preferably includes one or more screens 310 in front of the driver. For example, these comprise three LED monitors.

A computer with high processing capability is preferably synchronised with components of the simulator to record the driver's steer wheel activity and the vehicle's location in a coordinate system (x, y, and z-axis), for example. It also preferably generates pictures on the monitors 310 in front of the driver.

Temperature and lighting of the room where the simulator is situated may be controlled during the experiment.

Preferably, monotonous car engine sounds are continuously played in the background during the driving to contribute to the atmosphere of monotony preferred in this test.

The experimental setup further includes a plurality of sensing equipment, such as sensors, detectors and cameras, to collect data related to the human driver, comprising bio-data and beyond. Some may be installed fixedly in the simulated driving environment; some may be attached to the participant's body. The following apparatuses may be included in the setup:

a plurality of (e.g. three) video monitors 310 for displaying image(s) to the subject;

a driver's seat;

a plurality of cameras 320 to monitor the subject;

a plurality of (e.g. two) eye-tracking cameras 330 (e.g. Smart Eye);

a plurality of (e.g. two) photoplethysmography sensors in watches to be worn by the subject (e.g. Samsung Watch) to collect blood circulation data;

an ECG-telemetry system 340 with chest electrodes and the respiration curve measurement with a strain-gauge type pickup sensor to be worn by the subject (e.g. Zephyr Technology, BioHarness);

an EEG-recording system 350 with a 10 to 20-electrode system to be worn by the subject (e.g. Enobio);

one or more (e.g. two) conventional laptop PCs.

Some of the above are illustrated in the schematic diagrams FIGS. 3A and 3B which show an example of the simulator setup.

The plurality of sensing/detection/measurement means may be thought of as falling into two groups: primary sensors, which are used as a source of information in a production-like environment, e.g. a camera that captures the subject's facial features to help determine his level of drowsiness, which is the focus of the experiment; and secondary sensors, which are auxiliary detectors for better understanding the state of the subject or of the environment he is in, such as an EEG sensor for providing additional information about the human's physiological state, or a humidity sensor for collecting environmental information. Collection of data by all the separate components is synchronous.

Data Collection and Analysis

The human physiological data collected during the experiment includes at least one of: Heart rate/electrocardiogram (ECG):

a. This can be collected by sensors such as wearable body sensors/monitors, such as watches, straps, patches, harnesses, shirts, etc. with sensing capabilities (e.g. Zephyr sensor, Samsung watch sensor). This can also be collected using remote photoplethysmography (rPPG) using video equipment monitoring the driver's face.

Brain signals/electroencephalogram (EEG).

Eye movements.

Respiration.

More specifically, parameters of interest that could be collected, measured, or derived from collected data include one or more of:

RR intervals from the ECG;

respiration waveform;

respiration rate calculated from the peak-to-peak interval of the respiration curve;

EEG signals;

right-and-left eye gaze;

eyelid closure.

From direct observation of the driver on recorded video, certain events or indicators known to relate to drowsiness/sleepiness i.e. lack of wakefulness/alertness can be detected and counted. These events may include instances of the user doing or showing the following:

yawning;

drowsy facial expressions;

blinking, especially slow blinking;

eye closure;

rubbing eyes;

head falling;

head shaking.

The driver's behaviour as observed in terms of such events is used as references for determining his level of drowsiness. The frequency of the events, and the manner in which the driver shows them, may be taken into account; for example, the frequency of each event is calculated (e.g. number of events/30 sec).

Examples of collection of particular types of data are described below.

EEG (electroencephalogram) equipment and data collection: The EEG signals may be recorded with a 32-channel ENOBIO device following the international 10-20 system. The raw EEG signal data may be recorded at a 500 Hz using a portable EEG cap. The earlobe electrode may be a signal reference, one channel may be used for EOG correction, one channel for electric reference, and three channels accelerometer with sampling rate at 100 Hz.

ECG (electrocardiogram) equipment and data collection: ECG and RR-intervals (the time periods between consecutive heartbeats) may be measured using a miniature ECG sensor (e.g. BioHarness, at sampling rate 1000 Hz, by Zephyr Technology, Annapolis, MD, USA). The subject may wear a special chest belt with two electrodes that are located in the first and second chest leads. Batch data transmission from the sensor to a mobile device may be carried out through a wireless protocol e.g. Bluetooth.

Eye gaze recording equipment and data collection: Eye gaze data may be recorded using a wearable eye gaze tracker (e.g. commercially available eye gaze tracker Smart Eye DR120). Two cameras for gaze tracking may be installed within a horizontal bar attached to the bottom of the central screen above the steering wheel, to measure eye data samples at 120 Hz, although these are preferably downsampled to 60 Hz by software.

Face video recording: To capture face expressions from the driver, a web camera (e.g. Logitech webcam) may be used, pointed straight at the participant from the screen, capturing video at 30 frames-per-second (FPS). Preferably, for the analysis of rPPG, the camera may be positioned to capture the driver's whole head and upper torso with sufficient margins to keep the face in view, as he may show normal forward-oriented movements while driving. Preferably, the video capture is in black and white and the video resolution is 1920×1080.

In the present experiment protocol and subsequent analysis, straight-line driving is considered as a vigilance task. This is because it is an on-going continuous task of position-checking, deviation detection, and trajectory correction. While drowsy, the driver's perceptual sensitivity to deviations decreases; as a result farther (greater) deviations from straight-line driving occurs, and larger steering wheel corrections are needed. Accordingly, vigilance decrements can be detected through the standard deviation of the lateral position, steering wheel movements (SWM) and standard deviation of steering wheel movements (SDSWM) as monitored and evaluated. Another indicator of reduced vigilance is the difficulty to maintain a constant speed. This can be monitored through the average speed and standard deviation of speed as monitored and evaluated.

Non-physiological data measured and collected may comprise speed of the (simulated) vehicle, lateral position and steer wheel angle.

In any of the examples above or below, where a real vehicle is used instead of a simulated environment, the vehicle may be instrumented with a customised data acquisition system for time-synchronised recording of vehicular information from the steering wheel and pedals, and a physiological monitoring unit comprising for example ECG equipment, breathing monitor, rPPG, eye tracking system etc. (as mentioned above), a sound system (e.g. a microphone), and a series of cameras for tracking various aspects of driver behaviour and the surrounding driving environment. For implementing a DRT, instead of displaying the visual stimuli/indications (e.g. green and red circles) on the simulator screen to be reacted to, the instrumented vehicle may have a dedicated physical module attached or integrated into the driving panel, comprising light bulbs and associated buttons, for example.

Data collected at different components of the experimental set up, whether in a car simulator or a real car, may be transmitted via transmission means (represented by thick arrows 390 in FIGS. 3A and 3B) to storing means and/or processing means such as a computer, a server and/or a processor, such as the aforementioned laptop(s).

Variations

As mentioned there are various aspects of drowsiness that could affect driving performance. These, such as the level of the subject's sleep deprivation and the time spent on a task or tasks, can be monitored as well as controlled in experiments. Accordingly, other possible drowsiness validation experiments are considered:

1. Monotonous Driving Simulation

This is similar to the aforementioned basic version of the experiment protocol. The participant may be instructed to drive with the simulator non-stop for about 120 minutes, with 5-minute DRT sessions every 20 minutes. His heart rate, EEG, eye movements and optionally other bodily data are continuously recorded. Behaviour indicative of his mental state such as yawning, long-time eye closure, etc. is captured on video, as a reference for his drowsiness level.

2. Monotonous Driving Simulation, with Previous Sleep Deprivation

The driver participating in this trial is beforehand instructed to follow a sleep deprivation protocol between 7 and 30 hours before the start of the experiment proper, which as above may comprise a 120-minute driving simulation, with 5-minute DRT sessions every 20 minutes. There may also be included a final 15 minutes when the simulator is switched off but signal acquisition kept on, letting the subject rest with lights off.

3. Real Driving

Instead of using a simulated environment and/or simulator, the experiment may instead take place in a real driving situation. However, this is less preferred as the experiment focuses on a drowsy state in a driver. In this case, for example, it may include a 6-hour session with a professional driver driving a real vehicle on one or more roads/highways during a working day. Preferably, the roads/highways on which the test takes place have been identified to have relatively simple, monotonous conditions. The subject is not sleep deprived. A human test leader or assistant may accompany the driver to ensure safety.

4. Real Driving or Driving Simulation-Multiple Correlated Alert/Drowsy Sessions

In this option, there are multiple test sessions carried out by a single participant. For example, he (or she) conducts a driving session under an "alert" (fresh, awake) condition and another under a "sleepy" (drowsy, tired) condition, on a motorway, simulated or otherwise. For example, the "alert" session can take place in the daytime with consistent daylight e.g. late afternoon, and the "drowsy" at night with consistent darkness e.g. after midnight immediately following said afternoon. During the driving session in a simulator, distraction events may occur separated by intervals, e.g. there are 5-minute DRTs every 30 minutes.

In one example, a participant takes part in four driving sessions, for example:

real road driving+alert subject;
real road driving+sleep deprived subject;
simulator driving+alert subject;
simulator driving+sleep deprived subject.

The order of the driving sessions is preferably the same for all participants for consistency.

An exemplary experimental design using this variation is shown in Appendix 3.

Prior to the alert-condition test, the participant is instructed to sleep sufficiently, e.g. at least seven hours per night in the three nights prior to the test. Each driving session lasts for about 90 minutes. The driver may be instructed not to drink any caffeine-containing beverages from a certain point before the experiment starts. He may be instructed to drive as he would do "in real life". While driving he may not be allowed to speak, listen to the radio or do anything else that would counteract or interfere with feelings of sleepiness or level of alertness.

Before and after the driving session the driver may be asked to rate his sleepiness level on a KSS.

5. Real Driving with in-Car Human Monitor

A test leader may sit in the front passenger seat of the real vehicle with which the driving test is carried out. Preferably, the car has dual command and there is a small screen in front of the test leader showing the driver's face, so that the test leader could see if the participant closes his eyes. The test leader is responsible for the safety and is prepared to take control of the vehicle if the driver becomes too sleepy. However, here, the intention is not to let the driver fall asleep, but to stop the driving session before he does. The test leader is also supposed to stop the driving session if the driver drives in an unsafe way, either because of sleepiness or of other reasons (e.g. exceeded posted speed limit). The driver is explicitly told not to exceed speed limits for safety reasons, and that he is allowed to stop for a break if he feels it is necessary for his safety. If he chooses to take a break, it is prescribed that the test leader will stop him from continuing to drive.

6. Driving Simulation with Human Monitor

Each driving session may consist of four laps on the same motorway section. The total length of the test may be approximately 90 minutes. On average, every 30 minutes during the whole driving session, a DRT test may be performed by the driver. Preferably, a test leader sits outside the simulator and monitors the driver via video and sound system (loudspeakers/microphone). The test leader does not stop the driving session even if the driver falls asleep. The driver is informed that he could stop driving at any time if he, for example, feels sick.

For safety reasons, in the versions of the test protocol that uses a real road driving scenario, DRTs are preferably only performed when the vehicle is at a stop.

Processing of Collected Data

In accordance with any of the above disclosure, data can be collected in a consistent way following a predetermined test protocol, for exploring mental states of a driver in connection with environmental and road conditions.

The data, after being collected by the detection/data collection means such as medical sensors, monitors and cameras, may be transmitted to suitable processing means (e.g. computer processor, microprocessor, server in a computing system) and storing means (e.g. a memory in the system). The data may be analysed by the processing means, in order to determine the psychophysiological state of the subject. The results can be useful in informing the development of assisted driving software and hardware, such as serving as training data for machine-learning algorithms for determining the psychological state (e.g. level of drowsiness) of a driver in correlation with his (or her) observable bio-signals, data on response to distractions and mental exercise, and vehicle data.

System

Figure 4:
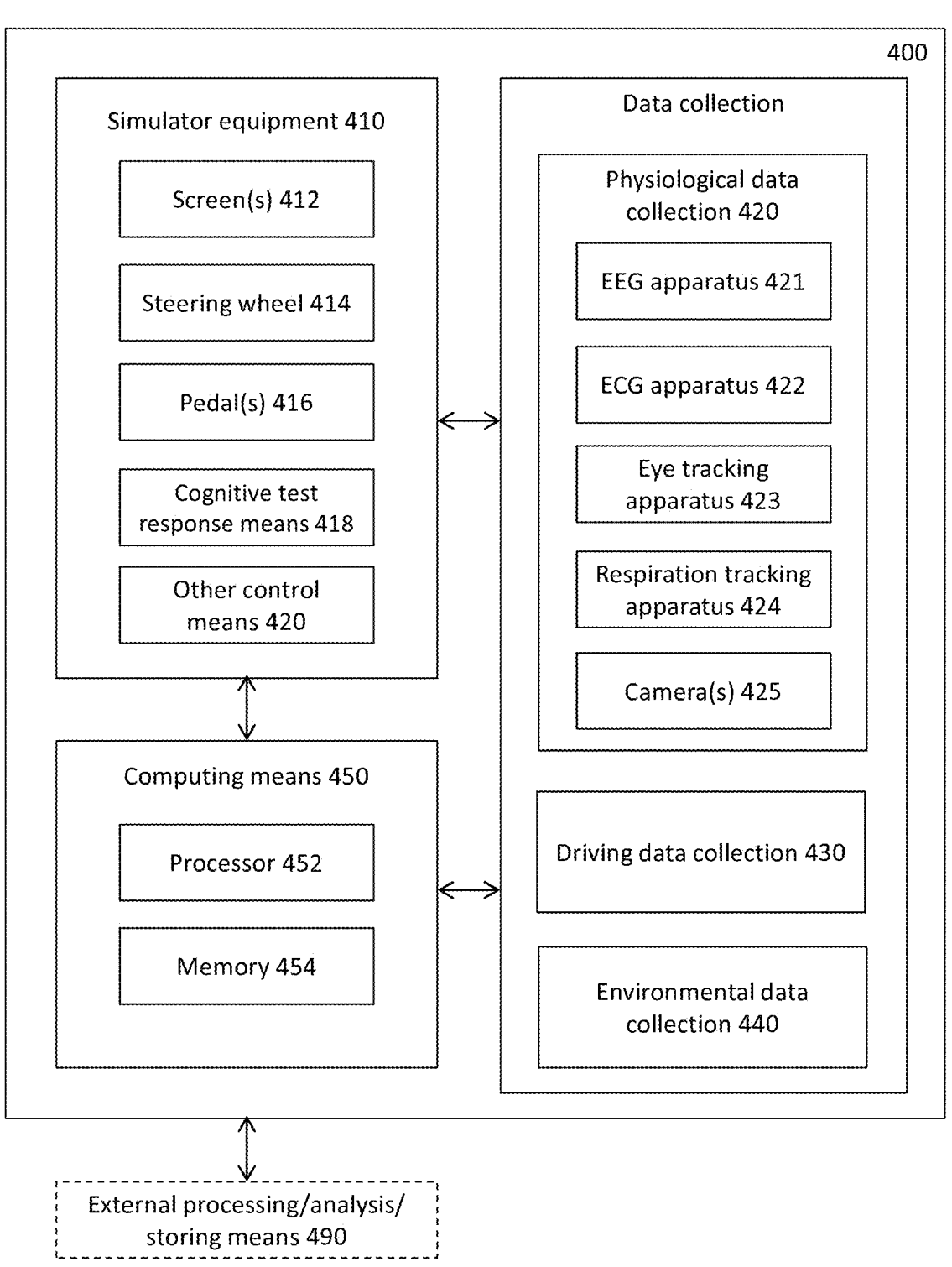
FIG. 4 is a block diagram for a system in accordance with an example.

In accordance with one embodiment, FIG. 4 depicts a block diagram for a system for carrying out a driving test to collect data on the driver with a view to understand levels of drowsiness (or in general, the driver's mental state) under controlled driving conditions, such as an monotonous driving environment.

The system preferably comprises a car simulator 400. The simulator preferably comprises equipment 410, including one or more screen(s) 412, steering wheel 414, pedal(s) 416, cognitive test (e.g. DRT) response/input means 418 such as one or more button(s) through which the user reacts to a visual stimulus in a DRT, 416 and means of controlling the simulator such as its temperature (air conditioner), humidity and background sound/noise (e.g. speakers) 420.

It may also comprise data collection means, including means for obtaining/detecting/measuring physiological data 420 of the driver, means for obtaining/detecting/measuring driving (driver behaviour) data 430, and means for obtaining/detecting/measuring simulator environment data 440.

The physiological data collection means 420 may include EEG apparatus 421, ECG apparatus 422, eye tracking apparatus 423, respiration tracking apparatus 424, at least one camera(s) 425, and other further sensors (not illustrated).

The system may also comprise computing means 450, which includes at least one processor(s) or (micro) processor(s) 452, and storing means (memory) 454. The processor(s) may be responsible for performing analysis on collected data. Alternatively, analysis may be performed in external computing means.

The various components and means within the simulator system are preferably connected to each other and operable to communicate with one another.

Optionally, there is provided external processing, analysis and/or storing means 490, such as a server, processor and/or memory, for performing at least part of the processing, analysis and/or storage. This is connected to the car simulator.

Some of the above components may be optional.

Methods

FIG. 5 is a flow chart illustrating a method 500 disclosed in accordance with one of many aspects of the present disclosure. The method includes step 510: collecting data throughout a driving session, wherein the driving session comprises a predetermined time period of non-stop driving by a driver in a monotonous driving environment and a plurality of detection response tasks (DRTs) performed by the driver in the predetermined time period, wherein each DRT comprises the driver reacting to at least one visual stimulus; this step comprises step 512: collecting, by a plurality of detection means, physiological data on the driver throughout the predetermined time period; wherein the physiological data collected comprises at least one of: heart rate data, electroencephalogram (EEG) data, eye movement data, and respiration data, and step 514: collecting driver behaviour data, comprising recording steer wheel activity of the driver and recording the driver's reaction to the at least one visual stimulus during the plurality of DRTs. The method subsequently includes, optionally, step 520: analysing the physiological data and the driver behaviour data to determine a level of drowsiness of the driver during the driving session.

FIG. 6 is a flow chart illustrating a method 600 in accordance with another aspect of the disclosure. The method comprises optional step 610: instructing a test subject to submit first self-reported data; optional step 620: instructing the test subject to rest for a first resting duration; optional step 730: instructing the test subject to submit second self-reported data; step 740: instructing a test subject to perform a driving session, wherein the driving session comprises a predetermined time period of non-stop driving in a monotonous driving environment and a plurality of DRTs performed by the test subject in the predetermined time period, wherein each DRT comprises the test subject reacting to at least one visual stimulus; step 650: collecting data throughout the driving session, comprising sub-step 652: collecting, using a plurality of detection means, physiological data on the test subject throughout the predetermined time period; wherein the physiological data collected comprises at least one of: heart rate data, EEG data, eye movement data, and respiration data and sub-step 654: collecting driver behaviour data, comprising recording steer wheel activity of the test subject, and recording the test subject's reaction to the at least one visual stimulus during the plurality of DRTs. The method further comprises optional step 660: instructing the test subject to submit third self-reported data; optional step 670: instructing the test subject to rest for a second resting duration, and optional step 680: instructing the test subject to submit fourth self-reported data. In steps 610. 630, 660 and 680, submitting self-reported data preferably comprises completing respective questionnaires by the driver.

FIG. 7 is a flow chart illustrating a method 700 in accordance with another aspect of the disclosure. The method comprises optional step 710: providing first self-reported data; optional step 720: resting for a first resting duration; optional step 730: providing second self-reported data; and step 740: performing a driving session at a driving simulator including sub-step 742: driving continuously for a predetermined time period in a monotonous driving environment and sub-step 744: performing a plurality of DRTs in the predetermined time period, comprising reacting to at least one visual stimulus. Steps 710 to 740 are performed by a human driver. The method then comprises step 750: collecting, by the simulator, data throughout the driving session, which comprises sub-step 752: collecting physiological data (similar to step 512) and sub-step 754: collecting driver behaviour data (similar to step 514). The method then comprises optional step 760: providing third self-reported data; optional step 770: resting for a second resting duration; and optional step 780: providing fourth self-reported data. Steps 760 to 780 are performed by the driver. In steps 710, 730, 760 and 780, providing self-reported data preferably comprises completing respective questionnaires by the driver.

The present invention is not to be limited by the above-described aspects and embodiments, and that many variations are within the scope of the appended claims. The various aspects and embodiments may be combined if necessary and appropriate. The drawings serve as exemplary illustrations of the invention only, to aid understanding of the invention.

Appendix 1

Timings according to an experimental protocol:

| Duration | Stage |
|---|---|
| ~10 min | Questionnaire (type 1) |
| 3 min | Rest + Closed eyes |
| 1 min | Rest + Open eyes |
| ~1 min | KSS questionnaire |
| 3 min | Driving + DRT |
| 27 min | Driving + line change(s) (1-4 times, at random moments in the first half of the way) |
| 3 min | Driving + DRT |
| 27 min | Driving + line change(s) (1-4 times, at random moments in the first half of the way) |
| 3 min | Driving + DRT |
| 27 min | Driving + line change(s) (1-4 times, at random moments in the first half of the way) |
| 3 min | Driving + DRT |
| 27 min | Driving + line change(s) (1-4 times, at random moments in the first half of the way) |
| 3 min | Driving + DRT |
| ~3 min | KSS questionnaire |
| 3 min | Rest + Open eyes |
| 1 min | Rest + Closed eyes |
| ~20 min | Questionnaire (type 3) |

In the above table: each "driving with DRT" section is indicated to last 3 minutes, but this may alternatively be any duration between 2 and 4 minutes, more preferably 2.5 to 3.5 minutes; each "driving with line change(s)" section is indicated to last 27 minutes, but this may alternatively be any duration between 25 and 30 minutes, more preferably 26 to 28 minutes; each rest period indicated to last 3 minutes may alternatively be any duration between 2 and 4 minutes; each rest period indicated to last 1 minute may alternatively be any duration between 0.5 and 2 minutes; the indicated timings for the test subject to complete each of the questionaires are also approximate.

Appendix 2

Timings in a reduced version of the protocol:

| Duration | Stage |
| --- | --- |
| ~10 min | Questionnaire 1 |
| 3 min | Rest + Open eyes |
| 1 min | Rest + Closed eyes |
| ~1 min | KSS questionnaire |
| 5 min | Driving + DRT |
| 110 min | Driving + line changes (10 times, at random moments within the way between-signals (to change the line) intervals are in the range 3-10 min) |
| 5 min | Driving + DRT |
| ~3 min | KSS questionnaire |
| 3 min | Rest + Open eyes |
| 1 min | Rest + Closed eyes |
| ~20 min | Questionnaire 3 |

In the above table: each "driving with DRT" section is indicated to last 5 minutes, but this may alternatively be any duration between 4 and 6 minutes; the "driving with line change(s)" section is indicated to last 110 minutes, but this may alternatively be any duration between 100 and 120 minutes, more preferably 105 to 115 minutes; each "resting with open eyes" section is indicated to last 3 minutes, but may alternatively be any duration between 2 and 4 minutes; each "resting with closed eyes" section is indicated to last 1 minutes, but may alternatively be any duration between 0.5 and 2 minutes; the indicated timings for the test subject to complete each of the questionnaires are also approximate

Appendix 3

| Driving session | Condition | Time of day | Light condition |
| --- | --- | --- | --- |
| 1. Real road | Alert | 08:30-11:30 am | Daylight |
| 2. Real road | Sleep-deprived | 00:30-03:30 am | Dark |
| 3. Simulator | Alert | 08:30-11:30 am | Daylight |
| 4. Simulator | Sleep-deprived | 00:30-03:30 am | Dark |

The invention claimed is:

1. A method of collecting data for determining a psycho-physiological state of a human driver, comprising:
collecting data throughout a driving session, wherein the driving session comprises a predetermined time period of non-stop driving by a driver in a monotonous driving environment and a plurality of detection response tasks (DRTs) performed by the driver in the predetermined time period, wherein each DRT comprises the driver reacting to at least one visual stimulus; wherein the driving session takes place after a first period of rest by the driver for a first predetermined duration, and a second period of rest by the driver for a second predetermined duration takes place after the driving session, and wherein said collecting data comprises:
collecting, by a plurality of detection means, physiological data on the driver throughout the predetermined time period; wherein the physiological data collected comprises at least one heart rate data, at least one electroencephalogram (EEG) data, at least one eye movement data, and at least one respiration data;
collecting driver behaviour data, comprising:
recording steer wheel activity of the driver; and
recording the driver's reaction to the at least one visual stimulus during the plurality of DRTs; and
collecting self-reported data from the driver before and after the driving session, the self-reported data comprising data on at least one of: the driver's psychological state, physical state or prior sleep conditions, wherein collecting self-reported data comprises:
collecting first self-reported data before the first period of rest;
collecting second self-reported data after the first period of rest and before the driving session;
collecting third self-reported data after the driving session and before the second period of rest; and
collecting fourth self-reported data after the second period of rest.

2. The method in accordance with claim 1, wherein said non-stop driving by the driver takes place in a simulated road environment using a car simulator.

3. The method in accordance with claim 1, wherein the each DRT comprises the driver reacting to the at least one visual stimulus, and wherein said recording the driver's reaction comprises at least one recording a response time of the user in reaction to the visual stimulus, at least one number of correct responses, and at least one number of incorrect responses.

4. The method in accordance with claim 3, wherein in each DRT the driver reacts to the at least one visual stimulus by physically pressing a button.

5. The method in accordance with claim 1, wherein in at least one of the plurality of DRTs, at least one false stimulus is provided to the driver that the driver is instructed to ignore; wherein the visual stimulus comprises a visual indication in a first colour, and the false stimulus comprises a visual indication in a second colour different from the first colour.

6. The method in accordance with claim 1, wherein the predetermined time period of the non-stop driving is under 130 minutes.

7. The method in accordance with claim 1, wherein each of the plurality of DRTs during the predetermined time period has a duration of between 2 and 4 minutes, and wherein a time interval between successive DRTs is between 25 and 30 minutes, and preferably 26 to 28 minutes.

8. The method in accordance with claim 1, wherein the plurality of detection means comprises at least one ECG (electrocardiogram) apparatus for obtaining heart rate data, at least one eye-tracking camera for obtaining eye movement data, at least one camera for obtaining video data of the driver's face, and at least one photoplethysmography sensor to collect blood circulation data.

9. The method in accordance with claim 1, further comprising:
analysing the physiological data and the driver behaviour data to determine a level of drowsiness of the driver during the driving session.

10. The method in accordance with claim 9, wherein analysing the physiological data and driver behaviour data comprises storing the collected data in a memory and/or sending the collected data to a processor for analysis.

11. The method in accordance with claim 10, further comprising storing results of the analysis and the collected physiological data and the collected driving behaviour data in a database, and using the database as training data for a machine-learning algorithm to predict or estimate the psychological state of a driver when driving.

12. A system for collecting data for determining a psychophysiological state of a human driver, comprising:

means for collecting data throughout a driving session, wherein the driving session comprises a predetermined time period of non-stop driving by a driver in a monotonous driving environment and a plurality of detection response tasks (DRTs) performed by the driver in the predetermined time period, wherein each DRT comprises the driver reacting to at least one visual stimulus; wherein the driving session takes place after a first period of rest by the driver for a first predetermined duration, and a second period of rest by the driver for a second predetermined duration takes place after the driving session, and wherein the means for collecting data comprises:

a plurality of detection means for collecting physiological data on the driver throughout the predetermined time period; wherein the physiological data collected comprises at least one heart rate data, at least one electroencephalogram (EEG) data, at least one eye movement data, and at least one respiration data; and means for collecting driver behaviour data, comprising:

means for recording steer wheel activity of the driver;

means for recording the driver's reaction to the at least one visual stimulus during the plurality of DRTs; and means for collecting self-reported data from the driver before and after the driving session, the self-reported data comprising data on at least one of: the driver's psychological state, physical state or prior sleep conditions, wherein said self-reported data comprises:

first self-reported data before the first period of rest;

second self-reported data after the first period of rest and before the driving session;

third self-reported data after the driving session and before the second period of rest; and fourth self-reported data after the second period of rest.

\* \* \* \* \*